United States Patent
Nishiguchi et al.

(10) Patent No.: US 6,942,922 B2
(45) Date of Patent: *Sep. 13, 2005

(54) CATIONIC PAINT COMPOSITION

(75) Inventors: Shigeo Nishiguchi, Hiratsuka (JP); Hidenori Sawada, Hiratsuka (JP); Hideki Iijima, Shiroyama-machi (JP); Koji Kamikado, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 26 days.

This patent is subject to a terminal disclaimer.

(21) Appl. No.: 10/365,538

(22) Filed: Feb. 13, 2003

(65) Prior Publication Data

US 2003/0165687 A1 Sep. 4, 2003

(30) Foreign Application Priority Data

Feb. 15, 2002 (JP) ........................................ 2002-038082

(51) Int. Cl.$^7$ .................... C09D 163/00; C09D 161/34; C09D 161/18
(52) U.S. Cl. ................. 428/418; 523/414; 523/415; 523/460; 525/481; 525/488; 525/523; 525/528; 525/533
(58) Field of Search .......................... 428/418; 523/414, 523/415, 460, 424; 525/481, 488, 523, 528, 533; 528/112

(56) References Cited

U.S. PATENT DOCUMENTS 5,459,208 A * 10/1995 Marten et al. .............. 525/523
6,503,629 B2    1/2003 Nishiguchi et al.
6,566,423 B2 *  5/2003 Schrotz et al. .............. 523/458
6,734,260 B2 *  5/2004 Nishiguchi et al. ......... 525/405

FOREIGN PATENT DOCUMENTS

JP      07010960    *  1/1995

* cited by examiner

*Primary Examiner*—David J. Buttner
(74) *Attorney, Agent, or Firm*—Wenderoth, Lind & Ponack, L.L.P.

(57) ABSTRACT

The present invention provides a cationic paint composition containing, as a vehicle component, a xylene-formaldehyde resin-modified amino group-containing epoxy resin obtained by reacting an epoxy resin having an epoxy equivalent of 180 to 2,500 with an alkyl phenol and/or a carboxylic acid, a xylene-formaldehyde resin, and an amino group-containing compound.

22 Claims, 1 Drawing Sheet

4-SHEET BOX THROWING POWER

(A)

REVERSE SIDES OF A, C, E, G ARE B, D, F, H (B)

MAGNETIC STIRRER

ELECTRODEPOSITION BATH

CATIONIC PAINT COMPOSITION

BACKGROUND OF THE INVENTION

1. Field of the Invention

The present invention relates to a cationic paint composition and more specifically relates to a cationic electrodeposition paint composition capable of forming a cured coating film excellent in performances such as a throwing power, a rust preventive steel plate aptitude, etc.

2. Description of the Prior Art

A cationic electrodeposition paint composition has been used mainly for undercoating of a car body as an electrodeposition paint and other wide range of applications, and products having various properties have been developed up to now. For example, there has been proposed a cationic electrodeposition paint composition which comprises a base resin containing an epoxy resin which comprises amino group and/or quaternary ammonium group as a water-solubilizing group and is internally plasticized with a plasticizer such as polyamide, polyester, polyether, etc., and which is excellent in corrosion resistance and good in rust preventive steel plate aptitude and adhesion. In such a cationic electrodeposition paint composition, there are compounded lead compounds or chromium compounds, for example, lead chromate, basic lead silicate, strontium chromate, etc. as an anticorrosive pigment. Recently, however, the use of such harmful compounds such as lead compounds or chromium compounds is restricted in terms of pollution problems, and the development of a cationic paint composition, excellent in corrosion resistance without compounding lead compounds or chromium compounds, has been strongly desired.

As an epoxy resin which is internally plasticized with a plasticizer tends to deteriorate the corrosion resistance of the coating film, it may be considered to improve the corrosion resistance by using an epoxy resin without containing a plasticizing modifier as a base resin. There is, however, a problem that a paint composition using a non-plasticized epoxy resin has a lower rust preventive steel plate aptitude.

Moreover, it has been proposed to compound to an epoxy resin a plasticizer which does not deteriorate the corrosion resistance of the coating film, for example, polyol resins such as polyester polyol, polyether-polyol, polyurethane polyol, acrylpolyol, etc.; polyolefin such as polybutadiene, polyethylene, etc. There are problems, however, that these materials are not compatible enough with an epoxy resin and are not only poorly effective to improve the rust preventive steel plate aptitude but also deteriorate the corrosion resistance of the coating film if compounded in a large amount.

On the other hand, a throwing power is required to a cationic electrodeposition paint composition as a rust preventive countermeasure for baggy parts of a car body (locker, side-sill, and pillar) etc. Particularly, a higher throwing power has been recently required to a cationic electrodeposition paint composition because of a more complicated body structure, such as putting reinforcement to the locker part and in the side-sill for levelling up of a car safety level. Therefore, it has been desired to develop a cationic electrodeposition paint composition having a high throwing power, and furthermore, excellent in corrosion resistance and rust preventive steel plate aptitude.

SUMMARY OF THE INVENTION

The present inventors repeated intensive research works to respond to the above-mentioned requirements. As a result, they have now found out that a cationic electrodeposition paint composition which not only has a high throwing power but also is excellent in rust preventive steel plate aptitude and corrosion resistance by compounding a certain specific kind of a xylene-formaldehyde resin-modified amino group-containing epoxy resin in a cationic electrodeposition paint.

Thus, according to the present invention, there is provided a cationic paint composition containing, as a vehicle component, a xylene-formaldehyde resin-modified amino group-containing epoxy resin obtained by reacting (a) an epoxy resin with an epoxy equivalent of 180 to 2,500, with (b) an acid compound selected from the group consisting of a phenol of the following formula (1) and a carboxylic acid of the following formula (2):

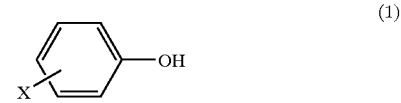

wherein,

X represents a hydrogen atom or a hydrocarbon group with 1 to 15 carbon atoms which may optionally have substituents selected from the group consisting of —OH, —OR, —SH, and —SR, Y represents a hydrocarbon group with 1 to 15 carbon atoms which may optionally have substituents selected from the group consisting of —OH, —OR, —SH, and —SR, in which R represents an alkyl group, (c) a xylene-formaldehyde resin, and (d) an amino group-containing compound.

Hereinafter, the cationic paint composition provided by the present invention will be described in more detail.

BRIEF DESCRIPTION OF THE DRAWINGS

Four sheets (of which three had a round hole of 8 mm diameter at a little lower from the center) of chemically treated steel plates (0.8×150×70 mm) were put together in a shape of box s shown in FIG. 1(A) (distance between each plate: 20 mm) and dipped in the electrodeposition bath as shown in FIG. 1(B).

Figure 1:
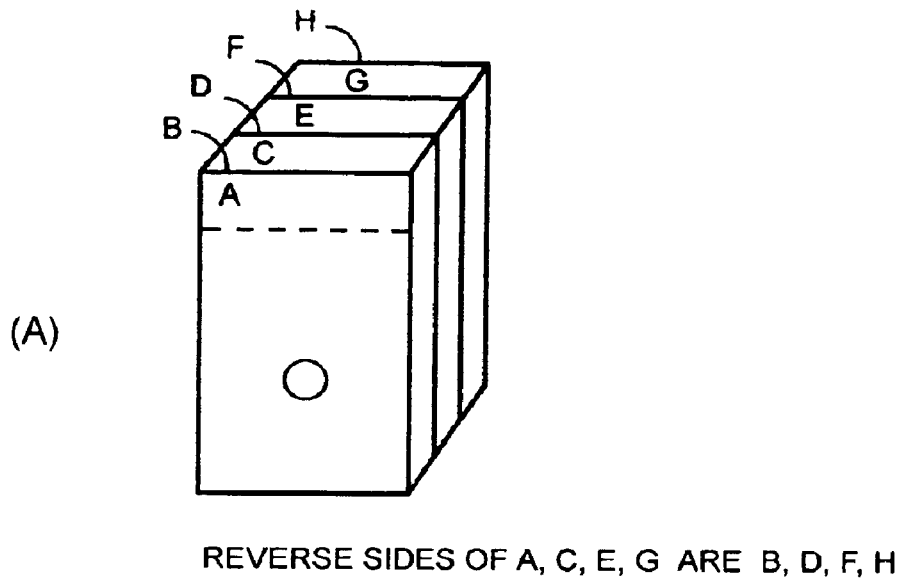
Figure 1:
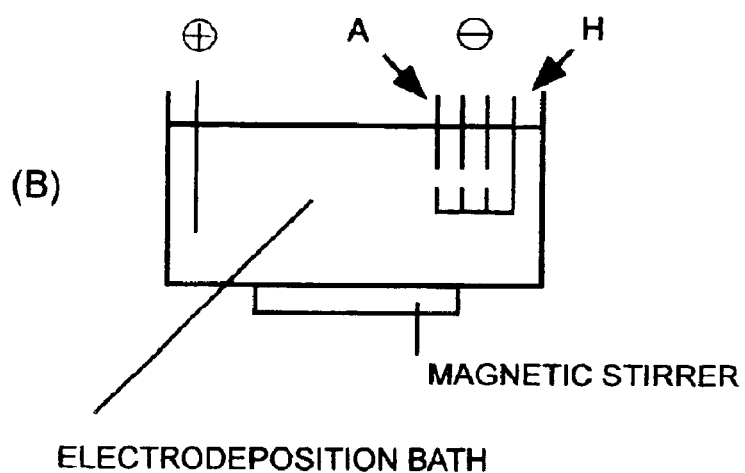

DETAILED DESCRIPTION OF THE INVENTION (a) Epoxy Resin:

As an epoxy resin (a) to be the main skeleton of the xylene-formaldehyde-modified amino group-containing epoxy resin according to the present invention, it is suitable to have an epoxy equivalent in the range of 180 to 2,500, preferably 200 to 2,000, and more preferably 400 to 1,500, and a number-average molecular weight of generally at least 200, preferably in the range of 400 to 4,000, and more preferably 800 to 2,500. If the epoxy equivalent of the epoxy resin is less than 180, the corrosion resistance and throwing power of the formed cationic paint composition is poor. If, on the other hand, it is more than 2,500, the rust preventive steel plate (zinc-plated steel plate) aptitude is remarkably deteriorated.

As such an epoxy resin (a), a product obtained by reacting a polyphenol compound with an epihalohydrin, for example, epichlorohydrin, is preferable from the viewpoint of a corrosion resistance etc. of the coating film.

As a polyphenol compound usable for the formation of said polyepoxide compound, there can be mentioned, for example, bis(4-hydroxyphenyl)-2,2-propane (bisphenol A), 4,4-dihydroxybenzophenone, bis(4-hydroxyphenyl) methane (bisphenol F), bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl) methane, tetra(4-hydroxyphenyl)-1,1,2,2-ethane, 4,4-dihydroxydiphenylsulfone, phenol novolac, cresol novolac, etc.

As an epoxy resin obtained by the reaction of the polyphenol compound and epichlorohydrin, above all, a product derived from bisphenol A and illustrated by the following formula

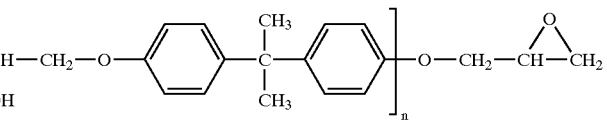

wherein n = 1–3 is preferable.

As such an epoxy resin which is commercially available, there can be mentioned, for example, products sold by Japan Epoxy Resin Co., Ltd. under the trade name of Epicote 828EL, ditto 1002, ditto 1004, and ditto 1007.

(b) Acid Compound:

An acid compound to be reacted with the above-mentioned epoxy resin (a) according to the present invention, is at least one kind of compound selected from the group consisting of a phenol of the following formula (1):

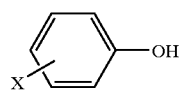

(1)

wherein

X represents a hydrogen atom or a hydrocarbon group with 1 to 15 carbon atoms which may optionally have substituents selected from the group consisting of —OH, —OR, —SH, and —SR, in which R represents an alkyl group;

and a carboxylic acid of the following formula (2):

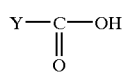

(2)

wherein

Y represents a hydrocarbon group with 1 to 15 carbon atoms which may optionally have substituents selected from the group consisting of —OH, —OR, —SH, and —SR, in which R represents an alkyl group.

In the above-mentioned formula (1), the hydrocarbon group with 1 to 15 carbon atoms represented by X can be straight chain, branched chain, or cyclic and, above all, alkyl groups with 1 to 15, particularly 1 to 12 carbon atoms, for example, methyl, ethyl, n-propyl, isopropyl, n-butyl, tert-butyl, nonyl, etc. are preferable. These groups may optionally be substituted with a group selected from the group consisting of a hydroxyl group (—OH), an alkoxy group (—OR), a mercapto group (—SH), and an alkylthio group (—SR).

As specific examples of the phenol of the above-mentioned formula (1), there can be mentioned, for example, phenol, cresol, ethylphenol, para-tert-butylphenol, nonylphenol, etc. and alkyl phenols are particularly preferable.

In the above-mentioned formula (2), the hydrocarbon group with 1 to 15 carbon atoms represented by Y can be straight chain, branched-chain, or cyclic and specifically includes, for example, alkyl groups such as methyl, ethyl, n-propyl, isopropyl, n-butyl, nonyl, etc.; alkenyl groups such as vinyl, oleyl, etc.; aryl groups such as phenyl. These groups may optionally be substituted with at least one, preferably 1 to 3 groups selected from the group consisting of a hydroxyl group, an alkoxy group, a mercapto group, and an alkylthio group. As a hydrocarbon group substituted with such a group, there can be mentioned, for example, 1-hydroxyethyl, 1,1-dimethylolethyl, 1,1-dimethylolpropyl, 3,4,5-trihydroxyphenyl, etc.

As carboxylic acids of the above-mentioned formula (2), there can be mentioned, for example, acetic acid, propionic acid, butyric acid, valeric acid, acrylic acid, oleic acid, glycolic acid, glyceric acid, lactic acid, dimethylolpropionic acid, dimethylolbutyric acid, dimethylolvaleric acid, benzoic acid, gallic acid, etc. Above all, acetic acid, propionic acid, butyric acid, oleic acid, dimethylolpropionic acid, dimethylolbutyric acid, dimethylolvaleric acid, and benzoic acid are preferable.

(c) Xylene-formaldehyde Resin:

In the present invention, a xylene-formaldehyde resin (c) is useful for internal plasticization (modification) of the above-mentioned epoxy resin (a), and it can be produced, for example, by subjecting xylene, formaldehyde, and optionally, phenols to condensation reaction in the presence of an acid catalyst.

As examples of the above-mentioned formaldehyde, there can be mentioned compounds which generate formaldehyde such as formalin, paraformaldehyde, and trioxane which are readily available in an industrial scale. When a polymer such as paraformaldehyde and trioxane is used in the present invention, a blending amount thereof is defined as a value per molecule of formaldehyde.

Further, the above-mentioned phenols include monovalent or divalent phenol compounds having two or three reaction sites, and specifically, they include, for example, phenol, cresols, paraoctylphenol, nonylphenol, bisphenolpropane, bisphenolmethane, resorcin, pyrocatechol, hydroquinone, para-tert-butylphenol, bisphenolsulfone, bisphenol ether, and paraphenylphenol. They can be used alone or in combination of two or more kinds thereof. Among them, phenol and cresols are particularly suited.

The acid catalyst used for condensation reaction of xylene, formaldehyde, and optionally, phenols includes, for example, sulfuric acid, hydrochloric acid, paratoluenesulfonic acid, and oxalic acid, and usually sulfuric acid is particularly suited. A use amount thereof, as usually diluted with water contained in a formaldehyde aqueous solution, can be controlled in the range of 10 to 50% by weight in terms of a concentration in the aqueous solution.

The condensation reaction can be carried out, for example, by heating at a temperature at which xylene, phenols, water, and formalin present in the reaction system are refluxed, usually at a temperature of about 80 to about 100° C., and it can be finished in 2 to 6 hours.

Xylene, formaldehyde, and optionally and preferably, phenols are reacted by heating under the above-mentioned condition in the presence of the acid catalyst, whereby the xylene-formaldehyde resin can be produced. The xylene-formaldehyde resin can also be produced by reacting a xylene-formaldehyde resin produced in advance with phenols in the presence of the acid catalyst.

The xylene-formaldehyde resin thus obtained has preferably a phenolic hydroxyl group capable of reacting with an epoxy group, and can have a viscosity in the range of usually 20 to 50,000 centipoise (25° C.), preferably 30 to 15,000 centipoise (25° C.). It has preferably a phenolic hydroxyl group equivalent in the range of usually 100 to 50,000, particularly 200 to 10,000.

(d) Amino Group-containing Compound:

An amino group-containing compound (d) to be reacted with the aforementioned epoxy resin (a) according to the present invention, is a component to give the cationicity to cationize said epoxy resin by introducing amino group to the epoxy resin substrate, and there is used a compound containing at least one active hydrogen which reacts with an epoxy group.

As an amino group-containing compound used for such a purpose, there can be mentioned, for example, mono- or di-alkylamines such as monomethylamine, dimethylamine, monoethylamine, diethylamine, monoisopropylamine, diisopropylamine, monobutylamine, dibutylamine, etc.; alkanolamines such as monoethanolamine, diethanolamine, mono(2-hydroxypropyl)amine, di(2-hydroxypropyl)amine, tri(2-hydroxypropyl)amine, monomethylaminoethanol, monoethylaminoethanol, etc.; alkylenepolyamines such as ethylenediamine, propylenediamine, butylenediamine, hexamethylenediamine, tetraethylenepentamine, pentaethylenehexamine, diethylaminopropylamine, diethylenetriamine, triethylenetetramine, etc., and ketiminized products of these polyamines; alkyleneimines such as ethyleneimine, propyleneimine, etc.; and cyclic amines such as piperazine, morpholine, pyrazine, etc.

Xylene-formaldehyde Resin-modified Amino Group-containing Epoxy Resin

A xylene-formaldehyde resin-modified amino group-containing epoxy resin used as a vehicle in the paint composition of the present invention, can be prepared by reacting the aforementioned epoxy resin (a) with the acid compound (b), the xylene-formaldehyde resin (c), and the amino group-containing compound (d) by a per se known process. Reactions of the acid compound (b), the xylene-formaldehyde resin (c), and the amino group-containing compound (d) to the epoxy resin (a) may be conducted in an optional order. Generally, however, it is preferable to react the acid compound (b) to the epoxy resin (a) first and then to add the xylene-formaldehyde resin (c) and the amino group-containing compound (d) to the reaction product at the same time.

Reaction of an epoxy resin (a) and an acid compound (b) can usually be conducted in an appropriate solvent and optionally in the presence of a catalyst at a temperature of about 60 to about 250° C., preferably about 70 to about 200° C. for about 1 to 25 hours, preferably about 1 to 12 hours. As the above-mentioned solvent, there can be mentioned, for example, hydrocarbons such as toluene, xylene, cyclohexane, n-hexane, etc.; esters such as methyl acetate, ethyl acetate, butyl acetate, etc.; ketones such as acetone, methyl ethyl ketone, methyl isobutyl ketone, methyl amyl ketone, etc.; amides such as dimethylformamide, dimethylacetamide, etc.; alcohols such as methanol, ethanol, n-propanol, isopropanol, etc.; or their mixtures. As a catalyst suitably used, there can be mentioned, for example, titanium compounds such as tetrabutoxy titanium, tetrapropoxy titanium, etc.; organic tin compounds such as tin octylate, dibutyltin oxide, dibutyltin laurate, etc.; metal compounds such as stannous chloride etc.; and organic amine compounds etc.

Thus, a reaction product in which an acid compound (b) has added to the skeleton of an epoxy resin (a) is obtained.

Addition reaction of a xylene-formaldehyde resin (c) and an amino group-containing compound (d) to the reaction product can usually be conducted in an appropriate solvent as mentioned above at a temperature of about 80 to about 170° C., preferably about 90 to about 150° C. for about 1 to 6 hours, preferably about 1 to 5 hours.

A use ratio of each reaction component in the above-mentioned reaction is not strictly limited and can suitably be varied according to the application of the paint composition etc. The following ranges, however, based upon the total solid content weight of the four components, epoxy resin (a), acid compound (b), xylene-formaldehyde resin (c), and amino group-containing compound (d), are appropriate.

Epoxy resin (a):
generally 45 to 85% by weight, preferably 50 to 80% by weight

Acid compound (b):
generally 0.5 to 15% by weight, preferably 1 to 10% by weight Xylene-formaldehyde resin (c):
generally 5 to 40% by weight, preferably 7 to 30% by weight Amino group-containing compound (d):
generally 5 to 25% by weight, preferably 6 to 19% by weight The xylene-formaldehyde resin-modified amino group-containing epoxy resin thus prepared can have an amine value in the range of usually 30 to 50 mgKOH/g, preferably 32 to 50 mgKOH/g.

Cationic Paint Composition

The cationic paint composition provided by the present invention contains a xylene-formaldehyde resin-modified amino group-containing epoxy resin prepared as mentioned above as a vehicle and is preferably used in a water-borne paint, particularly an electrodeposition paint.

The xylene-formaldehyde resin-modified amino group-containing epoxy resin according to the present invention can prepare a thermosetting cationic paint composition by using a crosslinking agent, for example, blocked polyisocyanate, a melamine resin, etc., particularly a blocked polyisocyanate crosslinking agent in combination.

The above-mentioned blocked polyisocyanate crosslinking agent is an addition reaction product of a polyisocyanate compound and an isocyanate-blocking agent to an approximately stoichiometric amount. As a polyisocyanate compound used in this case, there can be mentioned, for example, aromatic, alicyclic, or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophoron diisocyanate, diphenylmethane-2,4'-diisocyanate, diphenylmethane-4,4'-diisocyanate, polymethylene polyphenyl polyisocyanate, etc.; cyclization polymers of these polyisocyanates; isocyanate-biurets; and compounds containing terminal isocyanate obtained by reacting an excess amount of these isocyanate compounds with a low molecular active hydrogen-containing compound such as ethylene glycol, trimethylolpropane, hexanetriol, castor oil, etc. They can be used alone or in mixing two or more kinds thereof.

Among them, aromatic diisocyanates, above all, crude MDI is particularly preferable.

Crude MDI is a mixture of diphenylmethane-4,4'-diisocyanate, diphenylmethane-2,4'-diisocyanate, and polymethylene polyphenyl polyisocyanate as main components, and there can be mentioned as commercial products Cosmonate M-50, ditto M-200, ditto M-100, ditto M-300, etc. (manufactured by Mitsui Chemicals, Inc.); Sumidur 44V10, ditto 44V20, ditto 44V40, etc. (manufactured by Sumika Bayer Urethane Co., Ltd.); Lupranate M-12, ditto M-12S, ditto M-20, ditto M-20S, etc. (manufactured by BASF, Germany); and Mondur MR (LIGHT) etc. (manufactured by Bayer).

On the other hand, the aforementioned isocyanate blocking agent is a substance to be added to an isocyanate group of a polyisocyanate compound and to block it, and the blocked polyisocyanate compound formed by the addition is desirably stable at a normal temperature and capable of reproducing a free isocyanate group, dissociating the blocking agent, at the time of being heated to a baking temperature (usually about 100 to about 200° C.) of the coating film. As a blocking agent meeting such requirements, there can be mentioned, for example, lactam type compounds such as ε-caprolactam, γ-butyrolatam, etc.; oxime type compounds such as methyl ethyl ketoxime, cyclohexanone oxime, etc.; phenol type compounds such as phenol, p-t-butylphenol, cresol, etc.; aliphatic alcohols such as n-butanol, 2-ethylhexanol, etc.; aromatic alkyl alcohols such as phenylcarbinol, methylphenylcarbinol, etc.; and ether alcohol type compounds such as ethylene glycol monobutyl ether, diethylene glycol monoethyl ether, etc.

In addition to these blocking agents, a diol (1) having a molecular weight of 76 to 150 and two hydroxyl groups with different reactivities from each other and a carboxyl group-containing diol (2) having a molecular weight of 106 to 500, can be used as blocking agents. The above-mentioned diol (1) has two hydroxyl groups with different reactivities, for example, a combination of a primary hydroxyl group and a secondary hydroxyl group, a primary hydroxyl group and a tertiary hydroxyl group, or a secondary hydroxyl group and a tertiary hydroxyl group, and also has a molecular weight of 76 to 150. There can be mentioned, for example, diols having two hydroxyl groups with different reactivities such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol, and 1,4-hexanediol. Among them, propylene glycol is suited from the viewpoints of a reactivity of blocked polyisocyanate, a reduction in the heating loss, and a storage stability of the paint. In these diols (1), a hydroxyl group having a higher reactivity is usually reacted with an isocyanate group to block the isocyanate group.

Carboxyl group-containing diols having a molecular weight of 106 to 500 are included in the above-mentioned carboxyl group-containing diol (2), and the carboxyl group present in the molecule makes it possible to elevate a low temperature dissociative property to raise a curability at a low temperature. Particularly, when an organic tin compound is used as a curing catalyst, the curability at a low temperature can be elevated to a large extent. As the carboxyl group-containing diol (2), there can be mentioned, for example, 2,2-dimethylolpropionic acid, 2,2-dimethylolbutanoic acid, dimethylolvaleric acid, and glyceric acid.

A compounding ratio of a xylene-formaldehyde resin-modified amino group-containing epoxy resin and a blocked polyisocyanate crosslinking agent can be in the range of generally 55 to 90% by weight, preferably 55 to 85% by weight, and more preferably 55 to 80% by weight in the case of the xylene-formaldehyde resin-modified amino group-containing epoxy resin, and generally 10 to 45% by weight, preferably 15 to 45% by weight, and more preferably 20 to 45% by weight in the case of the blocked polyisocyanate crosslinking agent, based upon the total solid content weight of both components.

The cationic paint composition of the present invention containing the above-mentioned xylene-formaldehyde resin-modified amino group-containing epoxy resin and blocked polyisocyanate crosslinking agent can be prepared, for example, by sufficiently mixing the xylene-formaldehyde resin-modified amino group-containing epoxy resin and the blocked polyisocyanate crosslinking agent and then neutralizing the mixture with a water-soluble organic carboxylic acid, usually in an aqueous medium, to make such epoxy resin water soluble or water dispersible. Acetic acid, formic acid, or their mixture is particularly preferable as an organic carboxylic acid for neutralization. By using these acids, a finishing property, a throwing power, and a low temperature curability of the formed paint composition, and a stability of the paint are improved.

In the paint composition of the present invention, a bismuth compound can be contained as an anticorrosive agent. There is no restriction in the kind of bismuth compound to be compounded, and there can be mentioned, for example, inorganic bismuth compounds such as bismuth oxide, bismuth hydroxide, basic bismuth carbonate, bismuth nitrate, bismuth silicate, etc. Among them, bismuth hydroxide is particularly preferable.

Moreover, it is possible to use, as a bismuth compound, an organic bismuth salt which is prepared by reacting a bismuth compound as mentioned above with two or more kinds of organic acids, at least one of which is an aliphatic hydroxycarboxylic acid. As an organic acid usable for the preparation of said organic bismuth salt, there can be mentioned, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid, citric acid, etc.

The above-mentioned inorganic bismuth compounds and organic bismuth salts can be used each alone or in combination of two or more kinds.

A content of these bismuth compounds in the paint composition of the present invention is not strictly limited and can be varied in a wide range according to the performances required to the paint etc. Usually, however, it is appropriate to be less than 10% by weight, preferably in the range of 0.05 to 5% by weight, based upon the resin solid content in the paint composition of the present invention.

Further, the cationic paint composition of the present invention can optionally contain a tin compound as a curing catalyst. As said tin compound, there can be mentioned, for example, organotin compounds such as dibutyltin oxide, dioctyltin oxide, etc.; and aliphatic or aromatic carboxylates of dialkyltin such as dibutyltin dilaurate, dioctyltin dilaurate, dibutyltin diacetate, dioctyltin dibenzoate, dibutyltin dibenzoate, etc. Among them, dialkyltin aromatic carboxylates etc. are preferable from the viewpoint of a low temperature curability.

A content of such a tin compound in the paint composition of the present invention is not strictly prescribed and can be varied in a wide range according to the performances required to the paint etc. The tin content, however, is preferably in the range of usually 0.01 to 8 parts by weight, preferably 0.05 to 5 parts by weight per 100 parts by weight of the resin solid content in the paint.

In the cationic paint composition of the present invention, there can be further compounded, as necessary, additives for paint, for example, a modifier resin such as acrylic resins, a color pigment, an extender pigment, an anticorrosive pigment, an organic solvent, a pigment dispersing agent, a surface adjustment agent, etc.

The cationic paint composition of the present invention can be coated on a desired substrate surface by cationic electrodeposition coating. The electrodeposition coating can be conducted generally in an electrodeposition bath comprising the paint composition of the present invention, which is diluted with deionized water etc. so that the solid content concentration becomes about 5 to about 40% by weight, preferably 15 to 25% by weight and adjusted its pH in the range of 5.5 to 9, under the condition of the bath temperature usually adjusted to about 15 to about 35° C. and the load voltage of 100 to 450 V.

A film thickness of the electrodeposition coating film formed by using the paint composition of the present invention, is not particularly limited and is preferable generally in the range of 10 to 45 $\mu$m, particularly 15 to 30 $\mu$m based upon a cured coating film. A baking temperature of the coating film is suitable generally in the range of about 120 to about 200° C., preferably about 140 to about 180° C. on the substrate surface. A baking time can be about 5 to 60 minutes, preferably about 10 to 30 minutes.

The cationic paint composition of the present invention can be used preferably as a cationic electrodeposition paint, but it is not limited thereto. Besides, it can also be used as a solvent type paint for an anticorrosive primer for a steel plate to be coated by means of electrostatic coating, roller coating, etc.

Furthermore, the paint composition of the present invention can be used as a two liquid type room temperature-drying paint or an adhesive using a polyisocyanate compound or a melamine resin as a crosslinking agent.

The cationic paint composition of the present invention forms a cured coating film excellent in corrosion resistance, rust preventive steel plate aptitude, and adhesion to the substrate and is useful, for example, as an undercoat paint for a car body and car parts, in the field of construction and architecture, etc.

Especially, to a cationic electrodeposition paint, a throwing power is required as a rust preventive countermeasure for baggy parts of a car body (locker, side-sill, and pillar), and a higher throwing power is required because of a more complicated body structure such as putting reinforcement to the locker part and in the side-sill from the recent levelling up of safety level.

The cationic paint composition of the present invention has a high throwing power and can form an electrodeposition coating film excellent in corrosion resistance with an excellent electrodeposition coating aptitude even for a car body with a complicated structure.

EXAMPLES

Hereinafter, the present invention will be illustrated more specifically by referring to examples. The present invention shall, however, not be restricted to these examples in any way. "Part" and "%" mean "part by weight" and "% by weight", respectively.

Production Example 1

Production of a Xylene-formaldehyde Resin 1

A separable flask having a content volume of 2 liters equipped with a thermometer, a reflux condenser, and a stirrer was charged with 240 g of 50% formalin, 55 g of phenol, 101 g of 98% industrial sulfuric acid, and 212 g of metaxylene to react them at 84 to 88° C. for 4 hours. After finishing the reaction, the flask was stood still to separate a resin phase from a sulfuric acid aqueous phase, and then, the resin phase was washed three times with water and subjected to stripping of unreacted metaxylene on the conditions of 20 to 30 mm Hg and 120 to 130° C. for 20 minutes to obtain 240 g of a phenol-modified xylene-formaldehyde resin having a viscosity of 1,050 centipoise (25° C.).

Production Example 2

Production of a Xylene-formaldehyde Resin 2

An o-cresol-modified xylene-formaldehyde resin was obtained in the same manner as in Production Example 1, except that 55 g of o-cresol was substituted for 55 g of phenol.

Production Example 3

Production of a Xylene-formaldehyde Resin 3

A nonylphenol-modified xylene-formaldehyde resin was obtained in the same manner as in Production Example 1, except that 55 g of nonylphenol was substituted for 55 g of phenol.

Production Example 4

Production of a Xylene-formaldehyde Resin-modified Amino Group-containing Epoxy Resin No. 1

A flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A, and 0.2 g of dimethylbenzylamine, and they were reacted at 130° C. until the epoxy equivalent reached 750. Added there to was 120 g of nonylphenol and they were reacted at 130° C. until the epoxy equivalent reached 1,000.

Then, 200 g of the xylene-formaldehyde resin 1 obtained in Production Example 1, 95 g of diethanolamine, and 65 g of a ketimine compound of diethylenetriamine were added thereto to react them at 120° C. for 4 hours, and 414 g of butyl cellosolve was added subsequently to obtain a resin No. 1 having an amine value of 40 and a resin solid content of 80%.

Production Example 5

Production of a Xylene-formaldehyde Resin-modified Amino Group-containing Epoxy Resin No. 2

The same operation as in Production Example 4 was carried out to obtain a resin No. 2 having an amine value of 40 and a resin solid content of 80%, except that in Production Example 4, 200 g of the xylene-formaldehyde resin 2 obtained in Production Example 2 was substituted for 200 g of the xylene-formaldehyde resin 1.

Production Example 6

Production of a Xylene-formaldehyde Resin-modified Amino Group-containing Epoxy Resin No. 3

The same operation as in Production Example 4 was carried out to obtain a resin No. 3 having an amine value of 40 and a resin solid content of 80%, except that in Production Example 4, 200 g of the xylene-formaldehyde resin 3 obtained in Production Example 3 was substituted for 200 g of the xylene-formaldehyde resin 1.

Production Example 7

Production of a Xylene-formaldehyde Resin-modified Amino Group-containing Epoxy Resin No. 4

A flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A, and 0.2 g of dimethylbenzylamine, and they were reacted at 130° C. until the epoxy equivalent reached 750. Added there to was 61 g of benzoic acid and they were reacted at 130° C. until the epoxy equivalent reached 1,000. Then, 200 g of the xylene-formaldehyde resin 1, 95 g of diethanolamine, and 65 g of a ketimine compound of diethylenetriamine were added thereto to react them at 120° C. for 4 hours, and 400 g of butyl cellosolve was added subsequently to obtain a resin No. 4 having an amine value of 41 and a resin solid content of 80%.

Production Example 8

Production of a Xylene-formaldehyde Resin-modified Amino Group-containing Epoxy Resin No. 5

A flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A, and 0.2 g of dimethylbenzylamine, and they were reacted at 130° C. until the epoxy equivalent reached 750. Added there to was 74 g of dimethylolbutanoic acid and they were reacted at 130° C. until the epoxy equivalent reached 1,000. Then, 200 g of the xylene-formaldehyde resin 1, 95 g of diethanolamine, and 65 g of a ketimine compound of diethylenetriamine were added thereto to react them at 120° C. for 4 hours, and 400 g of butyl cellosolve was added subsequently to obtain a resin No. 4 having an amine value of 41 and a resin solid content of 80%.

Production Example 9

A flask was charged with 1,000 g of Epikote 828EL (trade name, epoxy resin manufactured by Japan Epoxy Resin Co., Ltd.; epoxy equivalent: 190 and molecular weight: 350), 400 g of bisphenol A, and 0.2 g of dimethylbenzylamine, and they were reacted at 130° C. until the epoxy equivalent reached 750. Then, 200 g of the xylene-formaldehyde resin 1, 140 g of diethanolamine, and 65 g of a ketimine compound of diethylenetriamine were added thereto to react them at 120° C. for 4 hours, and 400 g of butyl cellosolve was added subsequently to obtain a resin No. 5 having an amine value of 56 and a resin solid content of 80%.

Production Example 10

A flask was charged with 1,010 g of Epikote 828EL (trade name, epoxy resin manufactured by Japan Epoxy Resin Co., Ltd.), 390 of bisphenol A, and 0.2 g of dimethylbenzylamine, and they were reacted at 130° C. until the epoxy equivalent reached 800. Then, 160 g of diethanolamine and 65 g of a ketimine compound of diethylenetriamine were added thereto to react them at 120° C. for 4 hours, and 355 g of butyl cellosolve was added subsequently to obtain a resin No. 6 having an amine value of 67 and a resin solid content of 80%.

Production Example 11

A Blocked Polyisocyanate Crosslinking Agent

To 270 g of Cosmonate M-200 (trade name, crude MDI manufactured by Mitsui Chemicals, Inc.), 46 g of methyl isobutyl ketone was added and the temperature was elevated to 70° C. Then, 281 g of diethylene glycol monoethyl ether was slowly added thereto, and the temperature was elevated to 90° C. subsequently. Sampling was carried out with the passage of time while maintaining this temperature to confirm by infrared absorption spectrum measurement that absorption of unreacted isocyanate disappeared, whereby a blocked polyisocyanate crosslinking agent having a solid content of 90% was obtained.

Production of Clear Emulsion for Cationic Electrodeposition

After 87.5 g (70 g in terms of a resin solid content) of the resin No. 1 obtained in the above-mentioned Production Example 4, 33.3 g (30 g in terms of a resin solid content) of the blocked polyisocyanate crosslinking agent obtained in Production Example 11, 2.5 g of LSN-105 (trade name, dibutyltin dibenzoate manufactured by Sankyo Organic Chemicals Co., Ltd.; solid content: 40%), and 15 g of 10% acetic acid were mixed and stirred homogeneously, 156 g of deionized water was added drop by drop in about 15 minutes while strongly stirring to obtain a clear emulsion for cationic electrodeposition (a) having a solid content of 34%. Emulsions (b), (c), (d), and (e) were obtained in the same manner, using the compounding ratios as shown in the following Table 1.

Moreover, 68.8 g (55.0 g in terms of a resin solid content) of the resin No. 6 obtained in Production Example 10, 33.3 g (30 g in terms of a resin solid content) of the blocked polyisocyanate curing agent obtained in Production Example 11, 15 g of the xylene-formaldehyde resin 1 obtained similarly to Production Example 1, 2.5 g of LSN-105 (dibutyltin dibenzoate manufactured by Sankyo Organic Chemicals Co., Ltd.; solid content: 40%), and 15 g of 10% acetic acid were mixed and stirred homogeneously, and then, 160 g of deionized water was added drop by drop in about 15 minutes while strongly stirring to obtain a clear emulsion for cationic electrodeposition (f) having a solid content of 34% as shown in the following Table 1.

TABLE 1

Compounding for emulsions for cationic electrodeposition

|  | Example | | | | Comparative Example | |
|---|---|---|---|---|---|---|
|  | 1 | 2 | 3 | 4 | 1 | 2 |
| Emulsion | (a) | (b) | (c) | (d) | (e) | (f) |
| Resin No. 1 | 87.5 (70) | | | | | |
| Resin No. 2 | | 87.5 (70) | | | | |
| Resin No. 3 | | | 87.5 (70) | | | |
| Resin No. 4 | | | | 87.5 (70) | | |
| Resin No. 5 | | | | | 87.5 (70) | |
| Resin No. 6 | | | | | | 68.8 (55) |
| Xylene-formaldehyde resin 1 | | | | | | 15 (15) |
| Crosslinking agent | 33.3 (30) | 33.3 (30) | 33.3 (30) | 33.3 (30) | 33.3 (30) | 33.3 (30) |
| LSN-105 | 2.5 (1) | 2.5 (1) | 2.5 (1) | 2.5 (1) | 2.5 (1) | 2.5 (1) |
| 10% Acetic acid | 15 | 15 | 15 | 15 | 15 | 15 |
| Deionized water | 158.7 | 158.7 | 158.7 | 158.7 | 158.7 | 160 |
| 34% Emulsion | 297 (101) | 297 (101) | 297 (101) | 297 (101) | 297 (101) | 297 (101) |

( ): solid content weight

Production of Pigment Dispersion Paste

To 5.83 parts of 60% quaternary epoxy resin chloride, 14.5 parts of titanium white, 0.4 part of carbon black, 7.0 parts of an extender pigment, and 2.0 parts of bismuth hydroxide, 2.24 parts of deionized water was added and stirred sufficiently to obtain a pigment dispersion paste having a solid content of 55.0%.

Examples and Comparative Examples

Example 1

To 297 parts of the clear emulsion for cationic electrodeposition (a), 49.8 parts of the pigment dispersion paste and 235.7 parts of deionized water were added to obtain a cationic electrodeposition paint No. 1 having a solid content of 20%.

Examples 2 to 4 and Comparative Examples 1 and 2

In the same manner as Example 1, the pigment dispersion paste and deionized water were added to each of the clear emulsions for cationic electrodeposition (b) to (f) at the same compounding ratio as in Example 1 to obtain a cationic electrodeposition paints No. 2 to No. 6 having a solid content of 20%.

Coating Test

A zinc-plated steel plate of 0.8×150×70 mm which was chemically treated with Palbond #3080 (trade name, zinc phosphate treating agent manufactured by Nihon Parkerizing Company) was dipped in each cationic electrodeposition paint obtained in the above-mentioned Examples and Comparative Examples, and electrodeposition coating was conducted by using the plate as cathode (coating voltage of rust preventive steel plate: 270 V). The formed electrodeposition coating film was baked at 170° C. for 20 minutes by using an electric hot air drier. Performance test results of the obtained coated plates are shown in the following Table 2.

TABLE 2

Test results

|  | Example | | | | Comparative Example | |
|---|---|---|---|---|---|---|
| Cationic electrodeposition paint | 1 No. 1 | 2 No. 2 | 3 No. 3 | 4 No. 4 | 1 No. 5 | 2 No. 6 |
| Coating film performance | | | | | | |
| Throwing power (*1) | 65% | 63% | 65% | 63% | 35% | 55% |
| Rust preventive steel plate aptitude (*2) | ○ | ○ | ○ | ○ | ○ | × |
| Corrosion resistance (*3) | ○ | ○ | ○ | ○ | ○ | Δ |
| Impact resistance (*4) (unit: cm) | 50< | 50< | 50< | 50< | 50< | 40 |
| Secondary adhesive property (*5) | ○ | ○ | ○ | ○ | ○ | Δ |
| Bending resistance (*6) | ○ | ○ | ○ | ○ | ○ | × |

Performance tests were conducted according to the following methods.

(*1) Throwing Power:

The tests were conducted by a 4-sheet box method. Four sheets (of which three had a round hole of 8 mm diameter at a little lower from the center) of chemically treated steel plates (0.8×150×70 mm) were put together in a shape of box as shown in FIG. 1(A) (distance between each plate: 20 mm) and dipped in the electrodeposition bath as shown in FIG. 1(B). Electrodeposition coating was conducted under the above-mentioned condition. The surface AH was supposed to be an outer panel of a car body and the surface FG was supposed to be a baggy part of a car body. A throwing power was evaluated by film thickness of the surface FG/film thickness of the surface AH (%).

(*2) Rust Preventive Steel Plate Aptitude:

Number of pinholes was counted in 10×10 cm of the test piece of a zinc-plated steel plate which was dipped in an electrodeposition bath as cathode and coated under the voltage of 270 V at the bath temperature of 28° C. and evaluated according to the following criteria:

○: No pinhole was generated.

Δ: 3 to 5 pinholes were generated.

×: More than 10 pinholes were generated.

(*3) Corrosion Resistance:

Cross-cut lines were cut in the electrodeposition coating film on each electrodeposition coated plate, obtained by baking at a temperature of 170° C. for 20 minutes, with a knife reaching to the ground surface, to which salt water spray tests according to JIS Z-2371 were conducted for 840 hours and evaluated by the rust and blister width from the knife scratch according to the following criteria:

○: Maximum width of rust or blister was less than 2 mm from the cut part (one side).

Δ: Maximum width of rust or blister was more than 2 mm and less than 3 mm from the cut part (one side) and blistering was observed all over the coated surface.

×: Maximum width of rust or blister was more than 3 mm from the cut part and blistering was observed all over the coated surface.

(*4) Impace Resistance (Dupont Method):

After keeping the test plate obtained by baking at a temperature of 170° C. for 20 minutes in a constant temperature and constant humidity chamber of the temperature of 20±1° C. and the humidity of 75±2% for 24 hours, a stand and an impact point of the prescribed size were equipped to a Dupont impact test machine and the test plate was inserted between them with the coated side up. Then, a weight of the prescribed weight was fallen onto the impact point, and the maximum height provoking no cracking or chipping of the coating film by impact was measured.

(*5) Secondary Adhesive Property:

On the coated surface of the coated plate obtained by the aforementioned coating test, TP-37 Grey (trade name, aminoalkyd type intermediate paint manufactured by Kansai Paint Co., Ltd.) and NEO AMILAC 6000 (trade name, aminoalkyd type topcoat paint manufactured by Kansai Paint Co., Ltd.) were further coated successively, and it was baked and cured. The resulting coated plate was soaked in warm water of 40° C. for 240 hours and, after making 2 mm square check cuts on it, the remaining ratio (number of remained pieces/100) of the coating film at an adhesive tape peeling test was evaluated according to the following criteria:

○: 100/100
Δ: 90 to 99/100
×: less than 89/100

(*6) Bending Resistance:

After keeping the test plate in a constant temperature and constant humidity chamber of the temperature of 20±1° C. and the humidity of 75±2% for 24 hours, the test plate was bent to 180° in 1 to 2 seconds and evaluated according to the following criteria:

○: No abnormality was observed at both surfaces at the bent part.
×: Abnormality such as cracking, chipping, etc. was observed at least at either side.

What is claimed is:

1. A cationic paint composition containing, as a vehicle component, a xylene-formaldehyde resin-modified amino group-containing epoxy resin obtained by reacting
   (a) an epoxy resin with an epoxy equivalent of 180–2,500, with
   (b) an acid compound selected from the group consisting of a phenol of the following formula (1) and a carboxylic acid of the following formula (2):

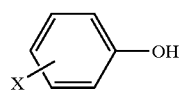

(1)

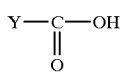

(2)

wherein,
   X represents a hydrogen atom or a hydrocarbon group with 1 to 15 carbon atoms which may optionally have substituents selected from the group consisting of —OH, —OR, —SH, and —SR,
   Y represents a hydrocarbon group with 1 to 15 carbon atoms which may optionally have substituents selected from the group consisting of —OH, —OR, —SH, and —SR
   in which R represents an alkyl group,
   (c) a xylene-formaldehyde resin having a phenolic hydroxyl group, and
   (d) an amino group-containing compound.

2. A cationic paint composition according to claim 1 wherein the epoxy resin (a) is obtained by reacting polyphenol compound and an epihalohydrin.

3. A cationic paint composition according to claim 2 wherein the polyphenol compound is bisphenol A.

4. A cationic paint composition according to claim 1 wherein the epoxy resin (a) has an epoxy equivalent in the range of 200 to 2,000.

5. A cationic paint composition according to claim 1 wherein a phenol of the formula (1) as the acid compound (b) is an alkylphenol.

6. A cationic paint composition according to claim 1 wherein a carboxylic acid of the formula (2) as the acid compound (b) is selected from the group consisting of acetic acid, propionic acid, butric acid, oleic acid, dimethylolpropionic acid, dimethylolbutyric acid, dimethylolvaleric acid, and benzoic acid.

7. A cationic paint composition according to claim 1 wherein the xylene-formaldehyde resin (c) is obtained by subjecting xylene, formaldehyde, and a phenol to condensation reaction in the presence of an acid catalyst.

8. A cationic paint composition according to claim 1 wherein the xylene-formaldehyde resin (c) is obtained by reacting a xylene-formaldehyde resin with a phenol in the presence of an acid catalyst.

9. A cationic paint composition according to claim 1 wherein the xylene-formaldehyde resin (c) a phenolic hydroxyl group equivalent falling in the range of 100 to 50,000.

10. A cationic paint composition according to claim 7 wherein the phenol is selected from the group consisting of phenol and cresols.

11. A cationic paint composition according to claim 1 wherein the xylene-formaldehyde resin (c) as a viscosity in the range of 20 to 50,000 centipoise (25° C.).

12. A cationic paint composition according to claim 1 wherein the xylene-formaldehyde resin-modified amino group-containing epoxy resin is obtained by reacting the epoxy resin (a) and the acid compound (b) first and then reacting the xylene-formaldehyde resin (c) and the amino group-containing compound (d) to the reaction product at the same time.

13. A cationic paint composition according to claim 1 wherein the xylene-formaldehyde resin-modified amino group-containing epoxy resin is obtained by reacting 45 to 85% by weight of the epoxy resin (a), 0.5 to 15% by weight of the acid compound (b), 5 to 40% by weight of the xylene-formaldehyde resin (c), and 5 to 25% by weight of the amino group-containing compound (d), based upon the total solid content weight of the epoxy resin (a), acid compound (b), xylene-formaldehyde resin (c), and amino group-containing compound (d).

14. A cationic paint composition according to claim 1 wherein the xylene-formaldehyde resin-modified amino group-containing epoxy resin is obtained by reacting 50 to 80% by weight of the epoxy resin (a), 1 to 10% by weight of the acid compound (b), 7 to 30% by weight of the xylene-formaldehyde resin (c), and 6 to 19% by weight of the amino group-containing compound (d), based upon the total solid content weight of the epoxy resin (a), acid compound (b), xylene-formaldehyde resin (c), and amino group-containing compound (d).

15. A cationic paint composition according to claim 1 wherein the xylene-formaldehyde resin-modified amino group-containing epoxy resin has an amine value in the range of 30 to 50 mgKOH/g.

16. A cationic paint composition according to claim 1 which further contains a blocked polyisocyanate crosslinking agent.

17. A cationic paint composition according to claim 16 which contains the blocked polyisocyanate crosslinking agent in the range of 10 to 45% by weight based upon the total solid content weight of the xylene-formaldehyde resin-modified amino group-containing epoxy resin and blocked polyisocyanate crosslinking agent.

18. A cationic paint composition according to claim 1 which further contains a bismuth compound as an anticorrosive agent.

19. A cationic electrodeposition bath comprising the cationic paint composition according to claim 1.

20. A cationic electrodeposition coating process characterized by using the cationic paint composition according to claim 1.

21. An article coated by using the cationic paint composition according to claim 1.

22. A cationic paint composition according to claim 8 wherein the phenol is selected from the group consisting of phenol and cresols.

* * * * *